(12) United States Patent
Muradov

(10) Patent No.: US 6,670,058 B2
(45) Date of Patent: Dec. 30, 2003

(54) THERMOCATALYTIC PROCESS FOR $CO_2$-FREE PRODUCTION OF HYDROGEN AND CARBON FROM HYDROCARBONS

(75) Inventor: Nazim Z. Muradov, Melbourne, FL (US)

(73) Assignee: University of Central Florida, Orlando, FL (US)

( * ) Notice: Subject to any disclaimer, the term of this patent is extended or adjusted under 35 U.S.C. 154(b) by 304 days.

(21) Appl. No.: 09/824,437

(22) Filed: Apr. 2, 2001

(65) Prior Publication Data

US 2002/0007594 A1 Jan. 24, 2002

Related U.S. Application Data

(60) Provisional application No. 60/194,828, filed on Apr. 5, 2000.

(51) Int. Cl.[7] .......................... C01B 31/02; C01B 3/24; C01B 3/26; H01M 8/04; H01M 8/06
(52) U.S. Cl. ................. 429/17; 423/445 R; 423/650; 423/651
(58) Field of Search ................. 423/650, 651, 423/445 R; 429/17

(56) References Cited

U.S. PATENT DOCUMENTS

| | | | |
|---|---|---|---|
| 1,528,905 A | 3/1925 | Woodruff | |
| 2,367,474 A | 2/1945 | Stewart | 196/52 |

(List continued on next page.)

OTHER PUBLICATIONS

Callahan, Catalytic Pyrolysis of Methane and Other Hydrocarbons, *Proc. Conference Power Source*, v. 26. 1974.

Muradov, How to Produce Hydrogen From Fossil Fuels Without $CO_2$ Emission, *Int. J. Hydrogen Energy*, v. 18, No. 3, pp 211–215, 1993.

Gaudernack, Hydrogen From Natural Gas Without Release of $CO_2$ to the Atmosphere, *Hydrogen /Energy Progress XI*, Stuttgart, Germany Jun. 23–28, 1996.

Poirier, Catalytic Decomposition of Natural Gas to Hydrogen for Fuel Cell Applications, *Int. J. Hydrogen Energy*, v. 22, No. 4, pp 429–433, 1997.

Muradov, $CO_2$–Free Production of Hydrogen By Catalytic Pyrolysis of Hydrocarbon Fuels for Transportation, *Hydrogen/Energy Progress XII*, Buenos Aires, Argentina, Jun. 21–26, 1998.

Shpilrain, Comparative Analysis of Different Natural Gas Pyrolysis Methods, *Int. J. Hydrogen Energy*, v. 24, pp 613–624, 1999.

Steinberg, Fossil Fuel Decarbonization Technology for Mitigating Global Warming, *Int. J. Hydrogen Energy*, v. 24, pp 771–777, 1999.

*Primary Examiner*—Wayne A. Langel
(74) *Attorney, Agent, or Firm*—Brian S. Steinberger; Law Offices of Brian S. Steinberger, P.A.

(57) ABSTRACT

This invention relates to a novel process for sustainable $CO_2$-free production of hydrogen and carbon by thermocatalytic decomposition (or dissociation, pyrolysis, cracking) of hydrocarbon fuels over carbon-based catalysts in the absence of air and/or water. The process is applicable to any hydrocarbon fuel, including sulfurous fuels. Combination of a catalytic reactor with a gas separation unit allows to produce high purity hydrogen (at least, 99.0 v %) completely free of carbon oxides. In a preferred embodiment, sustainable continuous production of hydrogen and carbon is achieved by both internal and external activation of carbon catalysts. Internal activation of carbon catalyst is accomplished by recycling of hydrogen-depleted gas containing unsaturated and aromatic hydrocarbons back to the reactor. External activation can be achieved via surface gasification of carbon catalysts by hot combustion gases during catalyst heating. The process can conveniently be integrated with any type of fuel cell.

14 Claims, 2 Drawing Sheets

U.S. PATENT DOCUMENTS

| | | | |
|---|---|---|---|
| 2,476,729 A | 7/1949 | Helmers | 196/52 |
| 4,256,606 A | 3/1981 | Noack | 252/411 |
| 4,615,993 A | 10/1986 | Schirrmacher | 502/55 |
| 5,100,638 A * | 3/1992 | Levin | 423/449 |
| 5,198,084 A * | 3/1993 | Cha et al. | 423/650 |
| 5,254,512 A | 10/1993 | Ueda | 502/52 |
| 5,300,468 A | 4/1994 | Senum | 502/34 |
| 5,525,322 A * | 6/1996 | Willms | 423/655 |
| 5,560,900 A * | 10/1996 | Gbordzoe et al. | 423/650 |
| 5,650,132 A | 7/1997 | Murata | 423/650 |
| 5,914,093 A * | 6/1999 | Nakamura | 423/651 |
| 6,315,977 B1 * | 11/2001 | Cantacuzene | 423/651 |
| 6,395,197 B1 * | 5/2002 | Detering et al. | 423/650 |
| 6,506,510 B1 * | 1/2003 | Sioui et al. | 429/17 |

* cited by examiner

THERMOCATALYTIC PROCESS FOR $CO_2$-FREE PRODUCTION OF HYDROGEN AND CARBON FROM HYDROCARBONS

This invention relates to the production of hydrogen, and in particular to a thermocatalytic process and apparatus for drastically reduced carbon dioxide emission in the production of hydrogen and carbon from fossil fuels and claims the benefit of priority of U.S. Provisional Application Serial No. 60/194,828 filed Apr. 5, 2000.

BACKGROUND AND PRIOR ART

In the near- to medium-term future hydrogen production will continue to rely on fossil fuels, primarily, natural gas (NG). On the other hand, conventional hydrogen production processes are among major sources of anthropogenic $CO_2$ emissions into the atmosphere. In principle, hydrogen can be produced from hydrocarbon fuels via oxidative and non-oxidative conversion processes. Oxidative conversion involves the reaction of hydrocarbons with oxidants: water, oxygen, or combination of water and oxygen (steam reforming, partial oxidation and autothermal reforming processes, respectively). As a first step, these processes produce a mixture of hydrogen with carbon monoxide (synthesis-gas), which is followed by gas conditioning (water gas shift and preferential oxidation reactions) and $CO_2$ removal stages. The total $CO_2$ emissions from these processes (including stack gases) reaches up to 0.4 m$^3$ per each m$^3$ of hydrogen produced. Non-oxidative route includes thermal decomposition (TD) (or dissociation, pyrolysis, cracking) of hydrocarbons into hydrogen and carbon.

TD of natural gas has been practiced for decades as a means of production of carbon black with hydrogen being a supplementary fuel for the process (Thermal Black process). In this process hydrocarbon stream was pyrolyzed at high temperature (1400° C.) over the preheated contact (firebrick) into hydrogen and carbon black particles. The process was employed in a semi-continuous (cyclic) mode using two tandem reactors. U.S. Pat. No. 2,926,073 to P. Robinson et al. describes the improved apparatus for making carbon black and hydrogen from hydrocarbons by continuous thermal decomposition process. Kvaemer Company of Norway has developed a methane decomposition process which produces hydrogen and carbon black by using high temperature plasma (CB&H process disclosed in the Proc. 12$^{th}$ World Hydrogen Energy Conference, Buenos Aires, 697, 1998). The advantages of the plasmochemical process are high thermal efficiency (>90%) and purity of hydrogen (98 v. %), however, it is an electric energy intensive process. Steinberg et al. proposed a methane decomposition reactor consisting of a molten metal bath (Int. J. Hydrogen Energy, 24, 771, 1999). Methane bubbles through molten tin or copper bath at high temperatures (900° C. and higher). The advantages of this system are: an efficient heat transfer to a methane gas stream, and, ease of carbon separation from the liquid metal surface by density difference. A high temperature, regenerative gas heater for hydrogen and carbon production from NG has been developed by Spilrain et al. (Int. J. Hydrogen Energy, 24, 613, 1999). In this process, thermal decomposition of NG was conducted in the presence of a carrier gas ($N_2$ or $H_2$) which was pre-heated to 1627–1727° C. in the matrix of a regenerative gas heater.

There have been attempts to use catalysts to reduce the maximum temperature of the TD of methane. Transition metals were found to be very active in methane decomposition reaction; however, there was a catalyst deactivation problem due to carbon build up on the catalyst surface. In most cases, surface carbon deposits were combusted by air to regenerate the original catalytic activity. As a result, all carbon was converted into $CO_2$, and hydrogen was the only useful reaction product. For example, Callahan describes a catalytic reactor (fuel conditioner) designed to catalytically convert methane and other hydrocarbons to hydrogen for fuel cell applications (Proc. 26th Power Sources Symp. Red Bank, N.J., 181, 1974). A stream of gaseous fuel entered one of two reactor beds, where hydrocarbon decomposition to hydrogen took place at 870–980° C. and carbon was deposited on the Ni-catalyst. Simultaneously, air entered the second reactor where the catalyst regeneration occurred by burning coke off the catalyst surface. The streams of fuel and air were reversed for another cycle of decomposition-regeneration. The reported process did not require water gas shift and gas separation stages, which was a significant advantage. However, due to cyclic nature of the process, hydrogen was contaminated with carbon oxides. Furthermore, no byproduct carbon was produced in this process. U.S. Pat. No. 3,284,161 to Pohlenz et al. describes a process for continuous production of hydrogen by catalytic decomposition of a gaseous hydrocarbon streams. Methane decomposition was carried out in a fluidized bed catalytic reactor in the range of temperatures from 815 to 1093° C. Supported Ni, Fe and Co catalysts (preferably $Ni/Al_2O_3$) were used in the process. The coked catalyst was continuously removed from the reactor to the regeneration section where carbon was burned off, and the regenerated catalyst was recycled to the reactor. U.S. Pat. No. 2,476,729 to Helmers et al. describes the improved method for catalytic cracking of hydrocarbon oils. It was suggested that air is added to the feedstock to partially combust the feed such that the heat supplied is uniformly distributed throughout the catalyst bed. This, however, would contaminate and dilute hydrogen with carbon oxides and nitrogen.

Use of carbon catalysts offers the following advantages over metal catalysts: (i) no need for the regeneration of catalysts by burning carbon off the catalyst surface; (ii) no contamination of hydrogen by carbon oxides; and, (iii) carbon is produced as a valuable byproduct of the process. Earlier, Muradov has reported on the feasibility of using different carbon catalysts for methane decomposition reaction (Proc. 12$^{th}$ World Hydrogen Conf., Buenos Aires, Argentina, 1998). It has also been taught to thermally decompose hydrocarbon feedstock over carbon particles acting as a heat carrier. U.S. Pat. No. 2,805,177 to Krebs describes a process for producing hydrogen and product coke via contacting a heavy hydrocarbon oil admixed with a gaseous hydrocarbon with fluidized coke particles in a reaction zone at 927–1371° C. Gaseous products containing at least 70 v. % of hydrogen were separated from the coke, and a portion of coke particles was burnt to supply heat for the process; the remaining portion of coke was withdrawn as a product. U.S. Pat. No. 4,056,602 to Matovich deals with high temperature thermal reactions, including the decomposition of hydrocarbons, by utilizing fluid wall reactors. Thermal decomposition of methane was conducted at 1260–1871° C. utilizing carbon black particles as adsorbents of high flux radiation energy, and initiators of the pyrolytic dissociation of methane. It was reported that 100% conversion of methane could be achieved at 1815° C. at a wide range of flow rates (28.3–141.5 l/min). U.S. Pat. No. 5,650,132 to Murata et al. produces hydrogen from methane and other hydrocarbons by contacting them with fine particles of a carbonaceous material obtained by arc discharge between carbon electrodes and having an external surface area of at least 1 m²/g. Carbonaceous materials also included: soot obtained from the thermal decomposition of different organic compounds or the combustion of fuels; carbon nanotubes; activated charcoal; fullerenes $C_{60}$ or $C_{70}$; and, finely divided diamond. The optimal conditions for methane conversion included: methane dilution with an inert gas (preferable methane concentration: 0.8–5% by volume); A temperature range of 400–1,200° C.; and residence times of −50 sec. An increase in methane concentration in feedstock from 1.8 to 8 v. % resulted in a drastic drop in methane conversion from 64.6 to 9.7% (at 950° C.). It was also stated that during hydrocarbon pyrolysis (the experiments usually ran for 30 min) the carbon samples gradually lost their catalytic activity. It was suggested that oxidizing gases like $H_2O$ or $CO_2$ be added to the pyrolyzing zone to improve the catalyst life. However, this would inevitably contaminate hydrogen with carbon oxides and require an additional purification step. Also, it was suggested that the spent catalyst be combusted, which would be, however, very wasteful, especially, considering the high cost of the carbon materials used in the process. U.S. Pat. Nos. 1,528,905; 2,367,474; 4,256,606; 4,615,993; 5,300,468 and 5,254,512 taught the different methods of regeneration of spent carbonaceous materials (CM), including activated carbons. However, these methods were mostly concerned with the reactivation of CM via removal (or displacement or decomposition) of the impurities (or adsorbable substances) from the surface of CM.

In summary of the foregoing, the major problem with the decomposition of methane (or other hydrocarbons) over carbon (or any other) catalysts relates to their gradual deactivation during the process. This could be attributed to two major factors: (i) loss of active surface area; and, (ii) inhibition of the catalytic process by the deposition of carbon species which are less catalytically active than the original carbon catalyst.

Thus, the need exists for a more effective, versatile and cost effective process for $CO_2$-free production of hydrogen and carbon from different hydrocarbons using inexpensive and readily available catalytic materials.

SUMMARY OF THE INVENTION

It is a primary objective of the present invention to develop a sustainable process for $CO/CO_2$-free production of hydrogen and carbon by thermocatalytic decomposition (pyrolysis, cracking) of hydrocarbon fuels.

A second object of this invention is to provide a process for the continuous production of hydrogen and carbon via thermocatalytic decomposition of hydrocarbon feedstock over carbon-based catalysts.

A third object of this invention is to provide a process for hydrogen and carbon production from any gaseous or liquid hydrocarbon fuel including, but not limited to, methane, propane, gasoline, kerosene, diesel fuel, residual oil and crude oil.

A fourth object of the invention is to provide a process for the continuous production of hydrogen and carbon using internally and externally activated carbon catalysts.

A fifth object of the invention is to provide a process for the production of hydrogen and carbon from sulfurous hydrocarbon fuels without additional purification of the feedstock.

A sixth object of the invention is to integrate the thermocatalytic reactor with a fuel cell for the production of electricity.

A preferred embodiment of the invention is a process for sustainable $CO_2$-free production of hydrogen and carbon via continuous thermocatalytic decomposition of hydrocarbons over a carbon-based catalyst in air and/or water-free environment, employing continuous reactivation of the catalyst, comprising the steps of: thermocatalytic decomposition of hydrocarbon stream over a moving bed of carbon particulates; recovering a stream of hydrogen-containing gas (HCG); directing said stream to a gas separation unit (GSU) where pure hydrogen is separated from said stream and hydrogen-depleted gas (HDG); recovering pure hydrogen; and, recycling said hydrogen-depleted gas to the reactor whereby the catalytically active carbon is generated on the surface of said original carbon catalyst. An apparatus is also described for carrying out the above identified process and its use in combination with a fuel cell for generation of electricity.

Further objects and advantages of this invention will be apparent from the following detailed description of a presently preferred embodiment, which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

According to this invention, the above objects can be achieved by thermocatalytic decomposition of hydrocarbon fuels in a moving bed reactor using carbon-based catalysts in air and/or water-free environment. The advantages and features of the present invention will be apparent upon consideration of the following description. The novel process for producing relatively pure hydrogen is based on a single-step thermocatalytic decomposition of hydrocarbons, preferably natural gas, over carbon-based catalysts in the absence of air and/or water according to the preferred (a) process and the generic (b) process as follows:

$$CH_4 \rightarrow C + 2H_2 + 75.6 \text{ kJ/mol}; \tag{a}$$

and,

$$C_nH_m \rightarrow nC + m/2 H_2 \tag{b}$$

wherein n is equal or greater than 1, and m is equal or less than (2n+2), and the reaction is endothermic.

The novelty of this approach completely eliminates the production of undesired contaminants, CO and $CO_2$, in the production of pure hydrogen and, consequently, the need for water gas shift reaction, $CO_2$ separation and $H_2$ purification steps required by conventional technologies (e.g. methane steam reforming, partial oxidation, and the like). The process (a) is moderately endothermic (37.8 kJ/mole of $H_2$), so that about 10% of methane feedstock would be needed to drive the process. In addition to hydrogen as a major product, the process produces a very important byproduct: clean carbon.

Figure 1:
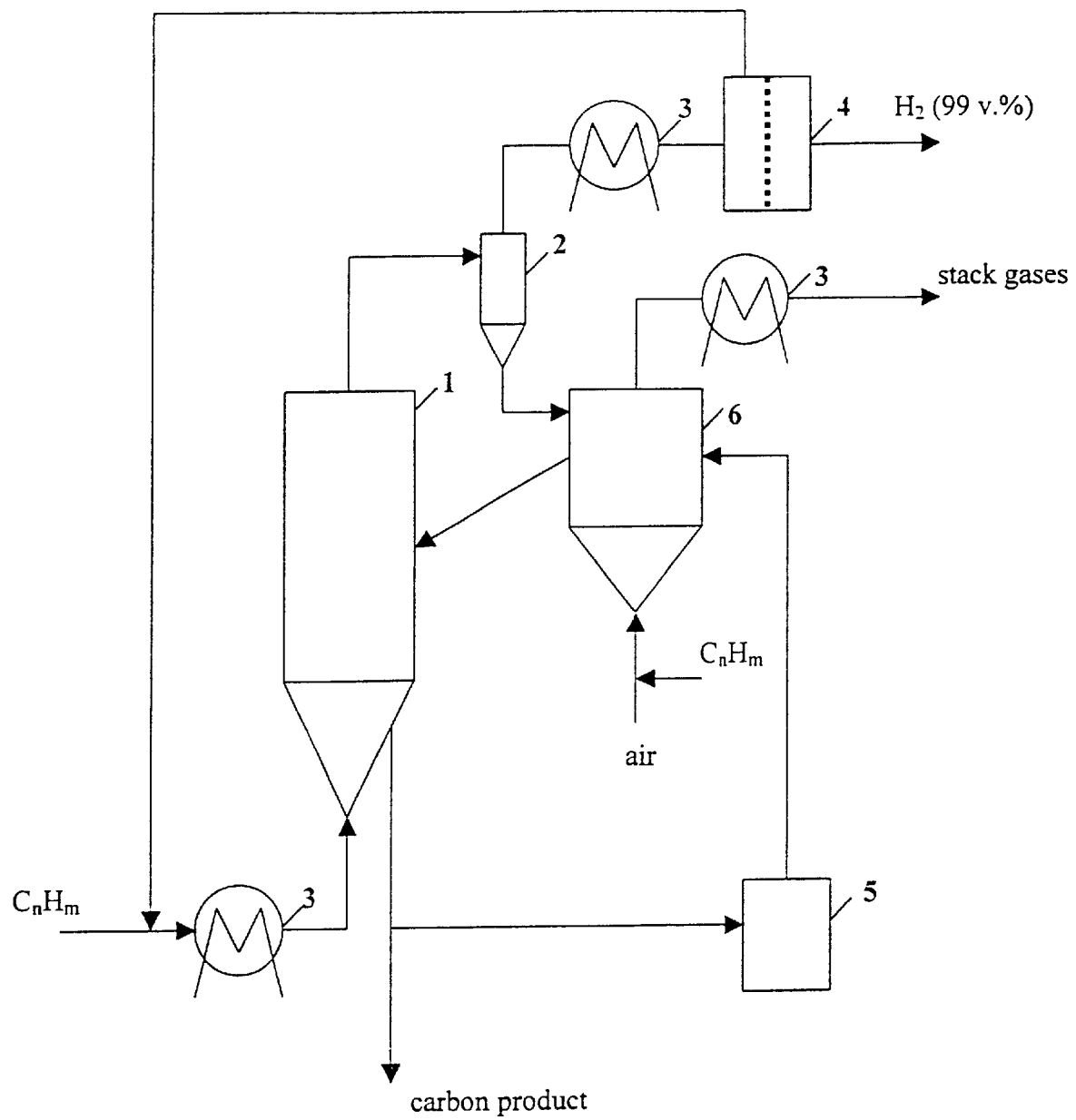
FIG. 1 is a schematic diagram of an apparatus for carrying out the process of the invention.

Reference should now be made to FIG. 1 which illustrates the inventive concept by providing a simplified schematic diagram of the process. A preheated stream of a hydrocarbon feedstock enters the thermocatalytic reactor 1 where it is thermocatalytically decomposed (pyrolyzed) at fluidized bed temperatures of approximately 700- approximately 1400° C. (preferably approximately 850- approximately 1000° C.) and pressure approximately 1- approximately 50 atm (preferably, approximately 1- approximately 25 atm) over a moving (e.g. fluidized) bed of the catalytically active carbon particulates. The residence time within the reaction zone is approximately 0.1- approximately 600 sec. (preferably, approximately 1- approximately 60 sec.). The hydrogen-containing gas (HCG) after the reactor 1, a cyclone 2 and a heat exchanger 3 is directed to a gas separation unit (GSU) 4, where a stream of hydrogen with at least 99.0 v. % purity can be under appropriate process conditions as disclosed herein is separated from the gaseous stream. A gas separation membrane, a pressure swing adsorption (PSA) system, a cryogenic absorption (or adsorption) unit, or any other system capable of separating hydrogen from hydrocarbons, could be employed as GSU.

The concentration of hydrogen in the HCG after the reactor 1 depends on the hydrocarbon feedstock, the temperature and the residence time and varies in the range of approximately 30- approximately 90 v. %, with the balance being methane and higher hydrocarbons ($C_2+$, including ethylene and other unsaturated and aromatic hydrocarbons). A hydrogen-depleted gas (HDG) consisting of $CH_4$ and $C_2+$ hydrocarbons, is recycled to the catalytic reactor 1. The concentration of gaseous olefins in HDG depends on the feedstock and could reach approximately 40 v. %. It is one of the important findings of this invention that the decomposition of unsaturated and aromatic hydrocarbons generates catalytically active carbon species which provoke and facilitate the methane decomposition reaction into hydrogen and carbon. It has been found that recycling of HDG (containing olefins and aromatic hydrocarbons) from the GSU 4 back to the reactor 1 sustains the high catalytic activity of the carbon catalyst during the process via in-situ generation of catalytically active carbon species. Product-carbon (coke) is withdrawn from the bottom of the fluidized bed reactor 1 in the form of carbon particulates (with a size>approximately 100 microns). A fraction (approximately. 20- approximately 30%) of carbon is ground into fine (<approximately 100 microns) powder (preferably,<approximately 20 microns) in a grinder 5 and is directed to a heater 6 where it is heated to approximately 900- approximately 1500° C. (preferably, approximately 950- approximately 1200° C.), activated, and recycled to the reactor 1.

The heat input necessary to drive the endothermic process can be provided by burning a portion of carbon with air in a heater 6. Alternatively: it could be done by combusting a part (approximately 10%) of the hydrocarbon feedstock; or a portion (approximately 10%) of the HDG; or a portion (approximately 10- approximately 15%) of the HCG after the reactor 1; or, a portion (approximately 15%) of hydrogen in a heater 6. The alternative options are preferable, since they also allow the reactivation of the carbon catalyst via surface gasification reactions with the products of hydrocarbon or hydrogen combustion: $CO_2$ and $H_2O$ (external activation). At high temperatures (such as approximately 1000° C.) combustion (flue) gases, containing $H_2O$ and $CO_2$, activate the carbon surfaces by gasifying carbon and increasing its surface area. Alternatively, heat to the reactor can also be provided by partial oxidation of aromatic hydrocarbons (e.g. benzene, toluene, naphthalene) produced as byproducts during pyrolysis of propane and liquid hydrocarbon feedstocks. This would also result in a simultaneous production of catalytically active carbon black particles, which will stick to the recycled carbon particles and be directed from a heater 6 to a reactor 1. Thus, a provision is made within this disclosure to internally (in-situ) and externally activate the carbon catalyst for the purpose of sustainable internal and external activation would increase the catalytic activity of carbon particles at least one order of magnitude. It has also been found for this novel process that the presence of sulfur in the hydrocarbon feedstock is not only harmless but actually helps to sustain catalytic process via intermediate formation of HS˙ radicals that actively attack hydrocarbon molecules of the feedstock. This implies that there is no need for a very costly desulfurization step before thermocatalytic conversion of sulfurous hydrocarbon feedstocks. This is in a drastic contrast to conventional catalytic reforming and partial oxidation processes which require complete desulfurization of a feedstock to ppm levels. Sulfur ends up in the form of elemental sulfur which could be condensed into solid product and conveniently removed from the technological streams.

Thus, due to low endothermicity of the process, elimination of several gas conditioning stages, the overall $CO_2$ emission from the proposed process would be at least one order of magnitude less than from conventional processes. It should be noted that the process could potentially be completely free of $CO_2$ emissions, if a portion of hydrogen is used as a heat source.

Figure 2:
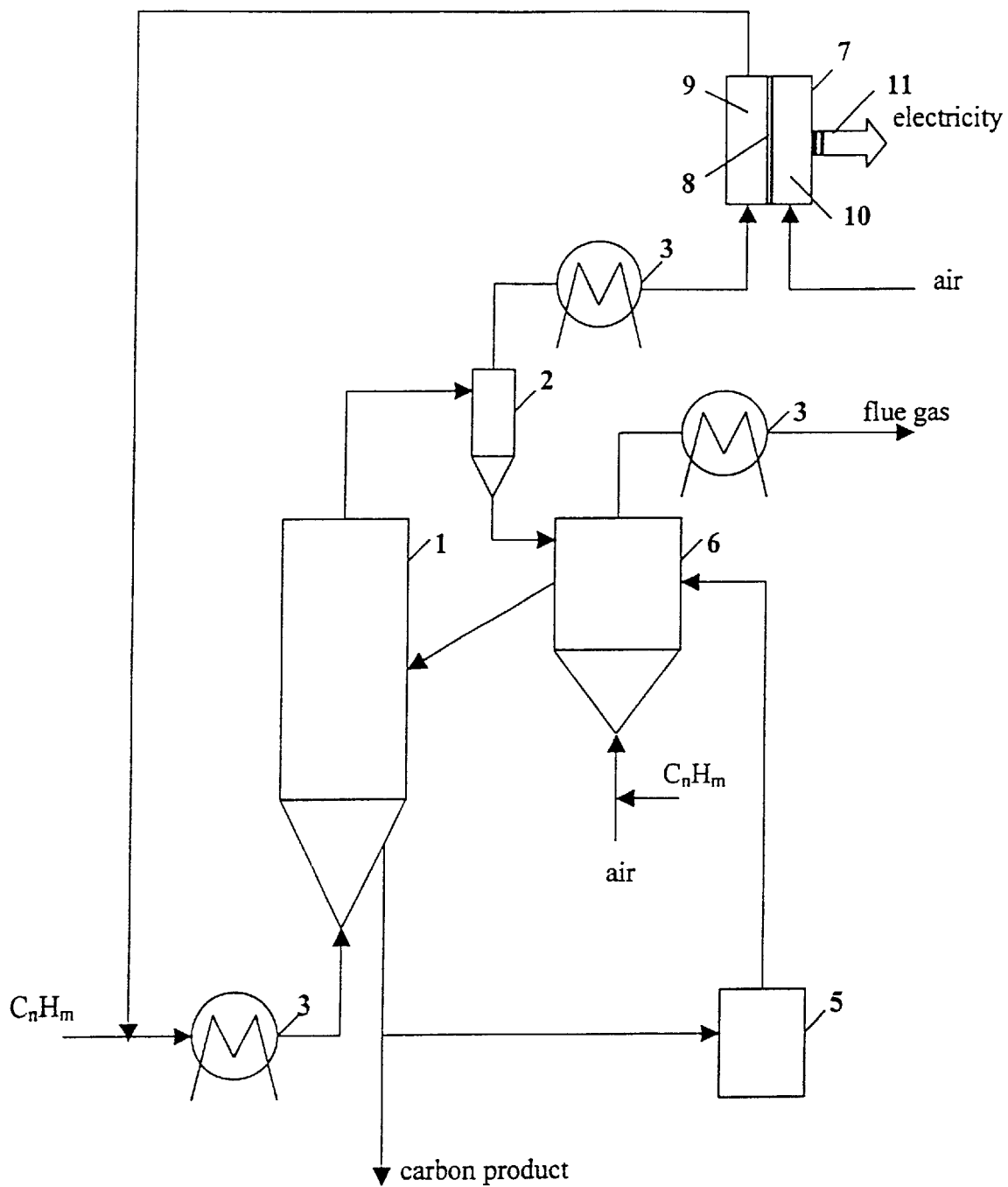
FIG. 2 is a schematic diagram of an apparatus integrated with a fuel cell.

One modification to the process relates to the integration of the thermocatalytic reactor with a fuel cell (FC) 7 (see FIG. 2). This modification would be particularly advantageous if FC is an end-user for hydrogen produced in the process (electric power production scenario). Another potential advantage of this integrated scheme relates to the possibility of direct usage of $CO/CO_2$-free effluent gas in FC 7 without complex and expensive gas conditioning stages (e.g. water gas shift, preferential oxidation, and the like.) required by conventional fuel reformation systems. This is especially important for polymer electrolyte membrane (PEM) and alkaline type FCs which are prone to deactivation by small amounts of CO and $CO_2$, respectively. The HCG after a reactor 1, a cyclone 2 and a heat exchanger 3 enters the anode compartment 9 of FC 7. Air is introduced into the cathode compartment 10 of FC 7. The anode and cathode compartments of FC 7 are separated by a membrane 8. Hydrogen is absorbed by FC (via electrochemical reactions on the anode surface resulting in the production of electricity 11), whereas, unconverted methane and $C_2+$ hydrocarbons are recycled to the reactor. Thus, the integrated process takes advantage of both internal and external activation of carbon catalyst. The rest of the embodiment is similar to that described in FIG. 1.

As earlier noted, the major problem with the decomposition of methane over carbon (or any other) catalysts relates to their gradual deactivation during the process. A process has been found which improves the activity and stability of carbon catalysts during the thermocatalytic process. The sustainability of the thermocatalytic process with regard to continuous, efficient and stable production of both hydrogen and carbon from a variety of hydrocarbon fuels (including, sulfurous fuels) is as noted another important aspect of the invention as will be further exemplified.

In Examples 1–6 the original catalytic activity (that is, without any additional activation) and relative stability of 3 major types of carbon materials (activated carbon, carbon black and graphite) were determined using methane, propane, gasoline and diesel fuel as feedstocks.

EXAMPLE 1

A sample of activated carbon DARCO® KB-B produced from hardwood (NORIT Americas Inc.) with surface area of 1,500 m$^2$/g, total pore volume of 1.8 ml/g and particle size of 150 $\mu$m was used in this example. 030 g of dry activated carbon (AC) was placed in a 5.0 ml quartz microreactor (a thin bed of carbon material ensured low pressure drop). The reactor was maintained at a constant temperature of 850° C. and atmospheric pressure. The reactor was purged with an inert gas (Ar) at 850° C. for 30 min. (to remove moisture and entrapped air from the catalysts) before introduction of methane. Methane (99.99 v. %) entered the catalytic reactor at a constant flow rate of 5.0 ml/min. The flow rate of the effluent gas after the reactor was measured with the accuracy of 5%. Carbon samples were weighed before and after experiment with the accuracy of 5%. Analysis of methane decomposition products was performed gas chromatographically. Methane decomposition rates (MDR) were determined from methane concentrations in the influent and effluent gases (adjusted to corresponding flow rates). The initial MDR (measured at 80$^{th}$ second, after the introduction of methane into the reactor) was equal to 2.04 mmole/min·g. MDRs were measured every 6–8 min, until the end of experiment (usually 90 min). Methane conversion rate after one hour was equal to 0.65 mmole/min·g, which corresponds to 3.1 fold decrease. It should be noted that in most experiments (with AC and other carbon catalysts) a quasi-steady state process was established over period of one after the onset of the process. Hereafter, a quasi-steady state (QSS) of the process relates to the time interval during which the process parameters (e.g. conversion, concentration of pyrolysis products in the effluent gas, flow rates) remain unchanged (within the margin of 10%). No traces of CO and CO$_2$ were detected in the effluent gas.

EXAMPLE 2

The experimental conditions for the examples 2 are similar to those of the Example 1, except, carbon black (CB) Black Pearls2000 (CABOT Corp.) with the surface area of 1500 m$^2$/g and particle size of 0.012 $\mu$m was used as a catalyst. The initial MDR and MDR after one hour were equal to 1.15 and 0.69 mmole/min·g, respectively (corresponding to 1.7 fold decrease in catalytic activity).

EXAMPLE 3

The experimental conditions for the Examples 3 are similar to those of the Example 1, except, graphite with the surface area of 10–12 m$^2$/g and particle size of 50 $\mu$m was used as a catalyst. The initial MDR and MDR after one hour were 0.07 and 0.06 mmole/min·g, respectively. It is evident from Examples 1–3 that activated carbon sample exhibited highest initial catalytic activity in methane decomposition reaction, whereas, carbon black showed somewhat lower initial activity, but better stability. Graphite showed very poor catalytic activity towards methane decomposition.

EXAMPLE 4

0.30 g of carbon black (XC-72) was placed in the quartz reactor with the volume of 10 ml. The reactor temperature was maintained at 800° C. during the entire experiment. The reactor was purged with Ar (to remove moisture and entrapped air from the catalyst), and propane was introduced into the reactor at the flow rate of 5.2 ml/min. A QSS rate of propane pyrolysis was established after 20 min, and it lasted until 95$^{th}$ min of the process. During QSS period propane was quantitatively (100% conversion) converted into pyrolysis gas with the average composition presented in Table 1. A flow rate of the effluent gas was averaged at 14.5 ml/min. After 90 min, both propane conversion and hydrogen concentration in the effluent gas started to gradually decrease. Simultaneously, the concentration of ethylene and propylene started to increase, and aerosol-like product appeared in the down stream of the reactor.

EXAMPLE 5

The experimental set-up similar to Example 4 was employed in this experiment. 0.30 g of activated carbon (hardwood) was used as a catalyst. Gasoline was introduced into the reactor (via an evaporator) by a syringe pump with the flow rate of 1.62 ml/h (liquid). The reactor temperature was 800° C. QSS was established between 20$^{th}$ and 80$^{th}$ minutes of the process, followed by gradual decrease in pyrolysis yield. The average flow rate of pyrolysis gas was 18.5 ml/min. The average composition of gasoline pyrolysis gas is presented in Table 1.

EXAMPLE 6

In this experiment diesel fuel was used as a feedstock. Diesel fuel was directly added to the reactor at flow rate of 1.8 ml/h (liquid) by syringe pump. The temperature of the reactor was maintained at 780° C. 1 g of carbon catalyst (AC coconut, 9–16 mesh) was mixed with 0.5 g of activated alumina (9–16 mesh). QSS was established between 40$^{th}$ and 120$^{th}$ min of the process. The average flow rate of pyrolysis gas 15.2 ml/min. The results are presented in Table 1.

TABLE 1

| Example No. | Hydro-carbon | Conversion, % | Pyrolysis gas composition*, v. % | | | | |
|---|---|---|---|---|---|---|---|
| | | | H$_2$ | CH$_4$ | C$_2$H$_6$ | C$_2$H$_4$ | C$_3$+ |
| 4 | Propane | 100 | 50.8 | 38.1 | 2.1 | 8.9 | 0.1 |
| 5 | Gasoline | 100 | 48.2 | 38.1 | 1.8 | 11.2 | 0.7 |
| 6 | Diesel fuel | 100 | 31.2 | 34.1 | 12.4 | 19.2 | 3.1 |

*This represents an average composition of pyrolysis gas during quasi-steady state pyrolysis of hydrocarbons The objective of Examples 7–9 is to demonstrate the feasibility of using fluidized bed reactors for thermocatalytic decomposition of hydrocarbons over carbon particulates.

EXAMPLE 7

0.2 g of carbon black Black Pearls2000 (preliminarily sieved to remove large aggregate particles) was placed in a quartz reactor (volume of the reaction zone 10 ml). The temperature of the reactor was maintained at 950° C. The reactor was purged with Ar for 30 min at this temperature to remove moisture and entrapped air from the catalyst. A stream of methane was introduced into the reactor from the bottom such that the adequate fluidization of carbon particles was maintained at the flow rate of 15 ml/min. Methane decomposition gas exited from the upper part of the reactor via ceramic wool filter. QSS of methane decomposition lasted from 30$^{th}$ to 240$^{th}$ min of the process. The average methane conversion during QSS was 23.5%. The effluent gas flow rate and methane conversion rate averaged at 18.5 ml/min and 0.72 mmole/min·g, respectively. The average composition of the effluent gas is presented in Table 2. Amount of carbon produced 0.11 g/h.

EXAMPLE 8

The experimental conditions are similar to Example 7, except propane was used as a feedstock. QSS was maintained from 10 to $60^{th}$ min of the process. The exit flow rate was 34 ml/min. It should be noted that immediately after QSS period we observed condensation of the crystals of naphthalene on the cold surfaces down stream the reactor. Naphthalene was identified and quantified by spectrophotometric method (Shimadzu UV-2401 PC). The yield of naphthalene produced during the entire experiment (2.5 h) was 0.15 mol. %. The amount of carbon produced was 0.35 g/h. The results are presented in Table 2.

EXAMPLE 9

The experimental conditions are similar to the Example 7, except $CH_4$-$C_3H_8$ (3:1 by volume) mixture was used as a feedstock. The methane-propane mixture was used as a surrogate for natural gas. QSS was sustained from $15^{th}$ to $90^{th}$ min of the process. The exit flow rate was 44.5 ml/min. Amount of carbon produced 0.15 g/h. The results are presented in Table 2.

decomposition rate. Over period of 30 min, however, methane decomposition rate gradually dropped to 6.8 μmole/min (which is close to the QSS value). The procedure was repeated twice and every time we observed a similar jump in methane decomposition rate after introduction of a pulse of ethylene. These data indicate that carbon produced by decomposition of ethylene is catalytically more active than the one produced from methane.

EXAMPLE 11

The experimental conditions are similar to those of the Example 10, except, the pulse of benzene (1.0 μmole) was introduced into the reactor instead of ethylene. In this case methane decomposition rate jumped from 6.0 to 12.1 μmole/min.

EXAMPLE 12

The conditions are similar to those of the Example 10, except, 0.1 μmole of naphthalene was decomposed over alumina surface before introduction of methane. This resulted in the increase in methane decomposition rate from 6.4 to 17.0 μmole/min.

TABLE 2

| Example No. | Hydrocarbon | Temperature, °C. | Flow rate, ml/min | Conversion,** % | Gaseous products*, v.% | | | | |
|---|---|---|---|---|---|---|---|---|---|
| | | | | | $H_2$ | $CH_4$ | $C_2H_6$ | $C_2H_4$ | $C_3+$ |
| 7 | $CH_4$ | 950 | 15.0 | 23.5 | 38.1 | 61.8 | 0 | 0.1 | 0 |
| 8 | $C_3H_8$ | 950 | 15.0 | 100.0 | 62.1 | 35.0 | 0.5 | 2.4 | 0 |
| 9 | $CH_4$—$C_3H_8$* | 950 | 20.0 | 100.0*** | 52.7 | 46.3 | 0.2 | 0.8 | 0 |

*$CH_4$—$C_3H_8$ mixture was used as a surrogate for natural gas
**These data relate to QSS conditions
***Conversion relates to propane The following Examples 10–15 provide the evidence of internal activation of carbon catalysts. Examples 10–12 are concerned with the relative catalytic activity of carbons produced by decomposition of ethylene, benzene and naphthalene (which are most important byproducts of TD of hydrocarbons) in methane decomposition reaction. Examples 13–14 evidence the increase in methane decomposition rate due to the presence of small amounts of benzene, gasoline and hydrogen sulfide in the feedstock. Thermal decomposition of hydrocarbons was conducted over an inert supports, such as alumina and silica gel, in order to eliminate possible catalytic effect of the substrate on methane decomposition.

EXAMPLE 10

0.030 g of activated γ-alumina (surface area 80–120 m²/g) was placed in a quartz reactor (volume 5 ml). The reactor was purged with Ar for 0.5 h at 850° C. to remove moisture and entrapped air from alumina. Methane was introduced into the reactor at flow rate of 5.0 ml/min and thermally decomposed for 1 h until QSS was established (at 850° C.). Methane conversion rate corresponding to QSS was 6.3 μmole/min. At this time, the reactor was purged with Ar for 15 min to remove methane from the reactor. This was followed by the pulse of 1.0 μmole of ethylene into the reactor at 850° C. At these conditions all the ethylene introduced was decomposed into hydrogen and carbon. The reactor was purged with Ar for 15 min and methane was introduced into the reactor at the original flow rate of 5.0 ml/min (at 850° C.). Methane decomposition rate increased to 10.8 μmole/min, which is 1.7 times higher than QSS

EXAMPLE 13

0.03 g of silica gel (surface area 600 m²/g) was placed in a quartz reactor with the volume of 5 ml. The reactor was purged with Ar for 0.5 h at 850° C. to remove moisture and entrapped air from silica gel. Methane was introduced into the reactor (850° C.) at flow rate of 5.0 ml/min for 20 min (until QSS was established). Corresponding methane decomposition rate was 0.2 μmole/min. This was followed by the introduction of methane-benzene (5 v. %) gaseous mixture into the reactor at the same temperature and flow rate. It was found that in the presence of 5 v. % benzene methane decomposition rate was 1.5 μmole/min (7.5 fold increase).

EXAMPLE 14

The experimental conditions were similar to 13, except, benzene was replaced by gasoline. 4 fold increase in methane decomposition rate was observed in the presence of 5 v. % of gasoline vapors.

EXAMPLE 15

In this example, the effect of small amount of $H_2S$ on methane decomposition rate is demonstrated. A 0.1 g of carbon black Black Pearls2000 was placed in a quartz reactor (volume 5 ml). The reactor was purged with Ar for 0.5 h at 900° C. Methane was introduced into the reactor (900° C.) at flow rate of 5.0 ml/min for 1 h (until QSS was established). Corresponding methane decomposition rate was 41.7 μmole/min. This was followed by the introduction of $CH_4$-$H_2S$ (3 v. %) mixture into the reactor at the same temperature and flow rate. The average methane decomposition rate over the period of 1 h was 45.8 μmole/min (note that the increase in methane decomposition rate was greater than the margin of error).

EXAMPLE 16

The objective of the Example 16 is to demonstrate the possibility of activation of carbon catalyst by hot hydrocarbon combustion gases containing $CO_2$ and water vapors (external activation). A 0.2 g of carbon black Black Pearls2000 was placed in a quartz reactor (volume 15 ml). The reactor was purged with Ar for 0.5 h at 850° C. Methane was introduced into the reactor (850° C.) at flow rate of 10.0 ml/min for 80 min (until QSS was established). Corresponding methane decomposition rate was 35.5 μmole/min. The reactor was purged with Ar for 15 min at the same temperature. This was followed by passing over the carbon catalyst (at 950° C.) the hot combustion gases from a propane burner for 10 min. The reactor was purged with Ar, and methane was introduced again into the reactor at 850° C. and the original flow rate. Methane decomposition rate was measured at 116.2 μmole/min (3.3 fold increase in methane decomposition rate).

Thus, the Examples 1 through 16 clearly demonstrate the technical feasibility of the approach. The major aspects of the process of the invention were verified through laboratory-scale tests The subject invention is directed to sustainable catalytic decomposition of any hydrocarbon feedstock (from natural gas to crude oil) into hydrogen and carbon at temperatures well below those characteristic of conventional thermal decomposition processes (by several hundred degrees).

The subject invention focuses on the means to produce $CO/CO_2$-free hydrogen and to drastically reduce $CO_2$ emissions from the process. Relatively low endothermicity of the hydrocarbon decomposition reactions (comparing to steam reforming), the absence of oxidants (air and steam) in the reaction zone, and the freedom from additional gas conditioning stages (e.g. water gas shift, preferential oxidation, $CO_2$ removal) would allow to reach this goal.

The subject invention takes advantage of relatively high catalytic activity of carbon species produced by decomposition of unsaturated and aromatic hydrocarbons. In this case, decomposition of hydrocarbons with the low activation energy (e.g. ethylene, aromatics) would induce decomposition of the hydrocarbon with the high activation energy (e.g. methane). Unsaturated and aromatic hydrocarbons are present in the pyrolysis gases of different hydrocarbons and mixtures of hydrocarbons (including, NG); their recycling to the reactor would provide the means to sustain high catalytic activity of carbon catalysts (via internal activation).

The subject invention is also concerned with the possibility of external activation of carbon catalyst during thermocatalytic decomposition of hydrocarbons. This could be achieved via surface activation of the carbon catalyst by hot combustion (flue) gases during heating the catalyst.

The subject invention is directed to processing sulfurous hydrocarbon feedstocks (including, $H_2S$-containing NG) without need for the additional purification. Not only sulfur compounds do not poison the carbon catalyst, but they slightly activate the catalytic process via intermediate production of active radicals.

Lastly, the subject invention takes advantage of the integration of the sustainable $CO_2$-free thermocatalytic process with a fuel cell for the purpose of production of electricity and pure carbon While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A process for sustainable $CO_2$-free production of hydrogen and carbon via continuous thermocatalytic decomposition of hydrocarbons over carbon-based catalyst in air and/or water-free environment, employing continuous reactivation of the catalyst, comprising the steps of:

(a) thermocatalytic decomposition of a hydrocarbon stream over a moving bed of carbon particulates in a reactor;

(b) recovering a stream of hydrogen-containing gas (HCCG);

(c) directing said stream to a gas separation unit (GSU) where pure hydrogen is separated from said stream and hydrogen-depleted gas (HDG), and a hydrogen-depleted stream containing unsaturated and aromatic hydrocarbons is formed;

(d) recovering pure hydrogen; and (e) recycling said hydrogen-depleted gas to the reactor whereby the catalytically active carbon is generated on the surface of said carbon-based catalyst, wherein internal activation of the carbon catalyst occurs by recycling said hydrogen-depleted stream containing unsaturated and aromatic hydrocarbons to the reactor.

2. The process of claim 1, including the step of: introducing an external combustion of a portion of said stream of hydrogen-containing gas(HCG) into said environment whereby there is an external activation of said carbon particulates.

3. The process of claim 1, including the step of: introducing an external combustion of a portion of said stream of hydrocarbon into said environment whereby there is an external activation of said carbon particulates.

4. The process of claim 3, wherein said hydrocarbon is a natural gas feedstock.

5. The process of claim 3, wherein said hydrocarbons contain sulfur.

6. The process of claim 2, including the step of: combustion of recovered carbon from said thermocatalytic decomposition process whereby the temperature of said decomposition is increased for sustainable production of hydrogen.

7. The process of claim 6, wherein carbon is withdrawn from the reactor, and a portion of the carbon is directed to a grinder and then to a heater, where heating and activation of said carbon catalyst occurs.

8. The process of claim 1, wherein said hydrocarbons is a hydrocarbon feedstock from natural gas to crude oil and mixtures thereof.

9. The process of claim 1, on wherein external activation of the carbon catalyst occurs via surface gasification of said carbon with hot flue gases arising from combustion of a hydrocarbon feedstock.

10. The process of claim 9, wherein additional external activation of carbon catalysts occurs by partial oxidation of aromatic hydrocarbons as byproducts of the process producing carbon black particles which adhere to a surface portion of said carbon catalyst.

11. The process of claim 1, wherein said thermocatalytic reactor is at a temperature of from about 800° C. to about 1000° C.

12. The process of claim 1, wherein said thermocatalytic reactor transit time ranges from approximately 1 to approximately 60 seconds.

13. The process of claim 1, wherein thermocatalytic reactor pressures range from approximately 1 to approximately 25 atmospheres.

14. A process for production of electricity and carbon via thermocatalytic decomposition of hydrocarbons over a carbon-based catalyst, comprising the steps of:

A. producing hydrogen by:
1) thermocatalytic decomposition of hydrocarbons over a fluidized bed of carbon particulates in a reactor;
2) recovering a stream of hydrogen-containing gas (HCCG);
3) directing said stream to a gas separation unit(GSU) where pure hydrogen is separated from said stream and hydrogen-depleted gas(HDG), and a hydrogen-depleted stream containing unsaturated and aromatic hydrocarbons is formed;
4) recycling said hydrogen-depleted gas to the reactor whereby catalytically active carbon is generated on the surface of said carbon particulates; and
5) recovering pure hydrogen;

B. continually introducing said pure hydrogen into an anode of a fuel cell;

C. continually passing air into a cathode of the fuel cell; and

D. producing electricity and recovering carbon therefrom, wherein internal activation of the carbon-based catalyst occurs by recycling said hydrogen-depleted stream containing unsaturated and aromatic hydrocarbons to the reactor.

* * * * *

UNITED STATES PATENT AND TRADEMARK OFFICE
CERTIFICATE OF CORRECTION

Page 1 of 1

PATENT NO. : 6,670,058 B2
APPLICATION NO. : 09/824437
DATED : December 30, 2003
INVENTOR(S) : Nazim Z. Muradov It is certified that error appears in the above-identified patent and that said Letters Patent is hereby corrected as shown below:

Col. 1, line 5 insert:

--STATEMENT REGARDING FEDERALLY SPONSORED RESEARCH OR DEVELOPMENT

This subject invention was made with government support under the US Department of Energy, federal contract number DEFC3699G010456. The government has certain rights in this invention.--

Signed and Sealed this
First Day of March, 2011

David J. Kappos
*Director of the United States Patent and Trademark Office*